United States Patent [19]

Nakashima

[11] Patent Number: 5,001,591
[45] Date of Patent: Mar. 19, 1991

[54] THIN FILM MAGNETIC HEAD
[75] Inventor: Keishi Nakashima, Nagaoka, Japan
[73] Assignee: Alps Electric Co., Ltd., Tokyo, Japan
[21] Appl. No.: 324,851
[22] Filed: Mar. 17, 1989
[30] Foreign Application Priority Data Jun. 3, 1988 [JP] Japan ................................. 63-73923

[51] Int. Cl.$^5$ .............................................. G11B 5/31
[52] U.S. Cl. .................................... 360/126; 360/103
[58] Field of Search ........................ 360/103, 126, 123

[56] References Cited
U.S. PATENT DOCUMENTS

| 4,219,853 | 8/1980 | Albert et al. | 360/103 |
| 4,317,149 | 2/1982 | Elser et al. | 360/126 |
| 4,405,960 | 9/1983 | Pick et al. | 360/126 |
| 4,759,118 | 7/1988 | Nakashima et al. | 29/603 |
| 4,800,454 | 1/1989 | Schwarz et al. | 360/103 |
| 4,809,103 | 2/1989 | Lazzari | 360/126 |
| 4,823,205 | 4/1989 | Hannon et al. | 360/103 |

Primary Examiner—Robert S. Tupper
Attorney, Agent, or Firm—Guy W. Shoup; David W. Heid

[57] ABSTRACT

According to the invention, there is provided a laminar magnetic head having bonding pads formed in so many layers and laminated with laminar component devices and circuits so that the surface areas of the bonding pads can be significantly enlarged without altering the arrangement of the lower layers of devices and circuits. Such a design ensures miniaturization and realization of a complex structure of a magnetic head as well as an enhancement of the workability and strength of the lead wires of the head for connection with by simply altering the patter of arrangement of the bonding pads and without significantly altering the production process that can involve a rise of manufacturing cost.

2 Claims, 3 Drawing Sheets

THIN FILM MAGNETIC HEAD

BACKGROUND OF THE INVENTION

This invention relates to a laminar magnetic head to be used for storage and retrieval of information to and from hard discs used as data storage medium for electronic equipment such as computers.

PRIOR ART

FIG. 6 of the accompanying drawings illustrates a floating type magnetic head assembly of the prior art typically used for storage and retrieval of data to and from hard magnetic discs for data storage. It comprises a laminar magnetic head 1 fitted to the lower surface of the tip of an elastic plate member called gimbals 2.

A laminar magnetic head 1 as shown here is typically manufactured through a process as illustrated in FIG. 7. In this process, a non-magnetic substrate 3, on which devices, circuits and other components that constitute magnetic heads have been formed in the form of a film, is covered by a protective film 4 to form a multi-layered sturcuture (FIG. 7(a)) and then the structure is cut along cutting lines A—A and B—B (FIG. 7(b)). Each of the separated heads is then machined into a slider and the surface of the protective film 4 is evenly abraded along abrasion line C—C (see FIGS. 9 and 10) for finishing until the bonding pad 5 formed on the nonmagnetic substrate 3 is exposed. At this stage, the head is finished (FIG. 7(c)). Thereafter, a lead wire 6 (see FIG. 6) is connected to the bonding pad 5. The abrasion operation to the surface of the protective film may be alternatively conducted prior to the machining operation of the slider.

FIGS. 8 through 10 illustrate the structure of a laminar magnetic head 1. As shown in FIG. 8, the head portion provided near the lateral front edges of the magnetic head is formed through lamination of an undercoat film 11, a lower magnetic material layer 12, an insulator layer 13, a conductive material layer 15 that constitutes a coil 14, an insulator layer 16 and an upper magnetic material layer 17. On the other hand, the terminal portion provided at the center of the magnetic head is formed by plating said bonding pad 5 on a lead terminal 18 which is realized in the form of a film and electrically connected with said conductive material layer 15 constituting a coil 14. The bonding pad 5 is formed formed significantly higher than other devices and circuits so that the latter would not be unintentionally abraded at the time of abrasing the protective film 4 to expose the top of the bonding pad 5.

The coil 14 is concentrically located with its center located in the back gap section between the lower magnetic material layer 12 and the upper magnetic material layer 17. The insulator layer 13 located in the front gap between the lower magnetic material layer 12 and the upper magnetic material layer 27 constitutes a magnetic gap 20.

It should be noted that the above described components are formed in pairs which are located symmetrically on the non-magnetic substrate 3 of each laminar magnetic head 1. The laminating and etching techniques used for forming the components are well known.

With a laminar magnetic head of the prior art as described above, the bonding pad 5 is required to have a considerable width in order to withstand external forces applied thereto during the work for connecting it to the lead wire 6 and maintain a certain level of strength of the connected area. However, There has been a surge of demand for miniaturization and compaction of electronic equipments comprising magnetic heads of this type. Such a trend in turn requires miniaturization of laminar magnetic heads, leading inevitably to dimensional reduction of various devices and circuits. Under these circumstances, it is very difficult to secure a considerably large space for a bonding pad 5 on the lead terminal 18 of a laminar magnetic head. This problem becomes even more complicated when a complex type head having separate head portions for data retrieval and storage is involved, because a head of this type requires more than one bonding pads 5.

SUMMARY OF THE INVENTION

According to the present invention, the above described problem is solved by providing a laminar magnetic head comprising component devices and circuits that connect the devices in the form of lamination as well as one or more than one laminar bonding pads formed on the terminals of the circuits for connecting the devices with external objects, wherein said bonding pads are formed in such a manner that they extend on said devices and/or circuits with interposition of insulator layers therebetween.

BRIEF DESCRIPTION OF THE DRAWINGS

The invention will be described in greater detail below by referring to accompanying drawings which illustrate preferred embodiments of the invention. In the drawings.

DETAILED DESCRIPTION OF THE INVENTION

Figure 1:
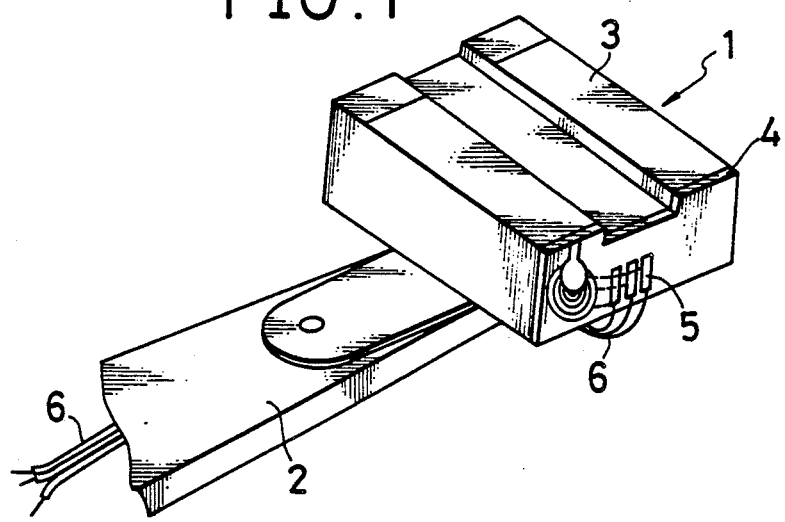
FIGS. 1 through 3 are schematic illustrations of a first embodiment of the complex type head according to the invention, in which three lead terminals 18 are formed for each coil 14.
Figure 2:
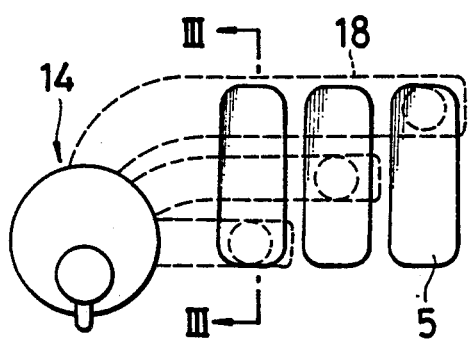
Figure 3:
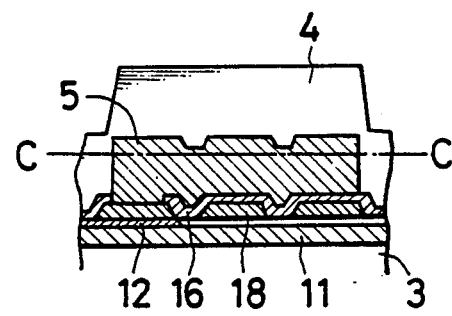

Referring to FIGS. 1 through 3 illustrating a first embodiment, each of the bonding pads 5 is so formed that it spreads over the lead terminals 18 of another bonding pad with interposition of a insulator layer 16 therebetween.

A laminar magnetic head as illustrated here is produced in the following manner. To begin with, a film of a conductive material is formed by using a known technique and the lead terminals 18 of a coil 14 are so formed that they extend in parallel but their lengths differ from each other as shown in FIG. 1. Then an insulator film 16 is formed to totally cover the coil and thereafter the portions of the insulator film which are found on the tips of the lead terminals 18 are removed by etching. Then a conductive material (such as copper) is laminated on the exposed areas so that they can be electrically connected with external objects. The laminated material is extended in the direction perpendicular to the direction of the lead terminals 18 so that it covers another set of lead terminals with interposition of a insulator film 16. This process of pattern formation is conducted by using a known technique with which a film is formed either over the entire surface of a head, from which the portions of the film covering the unnecessary areas are removed in a later stage of the process, or only on the necessary areas by masking the unnecessary areas.

After forming bonding pads 5 in the manner as described above, the head is totally covered with a protective film of $Al_2O_3$, $SiO_2$, an inorganic oxide other than these or a resin material by means of sputtering and then the surface of the head is abraded to expose the head of each of the bonding pads 5.

Figure 6:
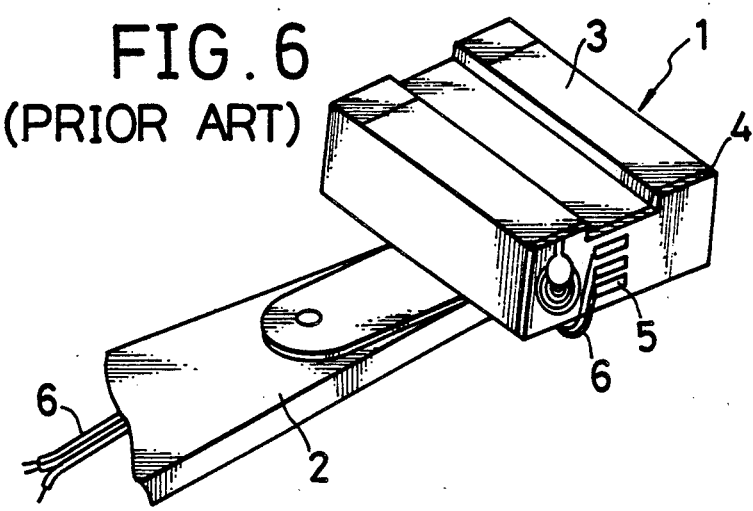
FIGS. 6–10 are schematic illustrations of the prior art.
Figure 7A:
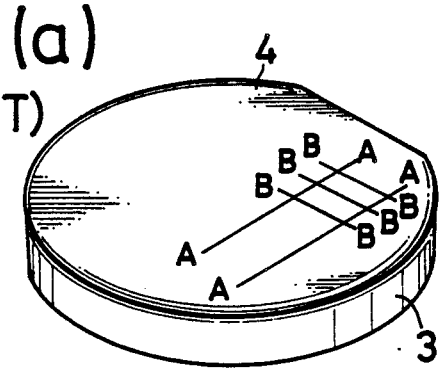
Figure 7B:
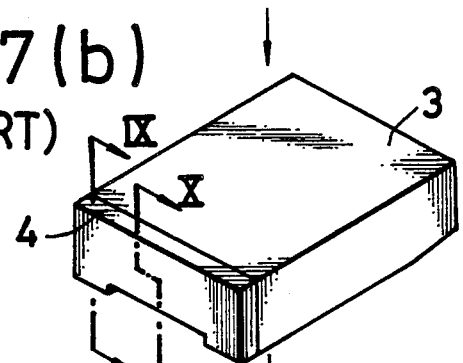
Figure 7C:
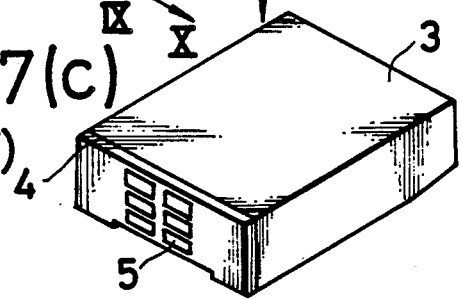
Figure 8:
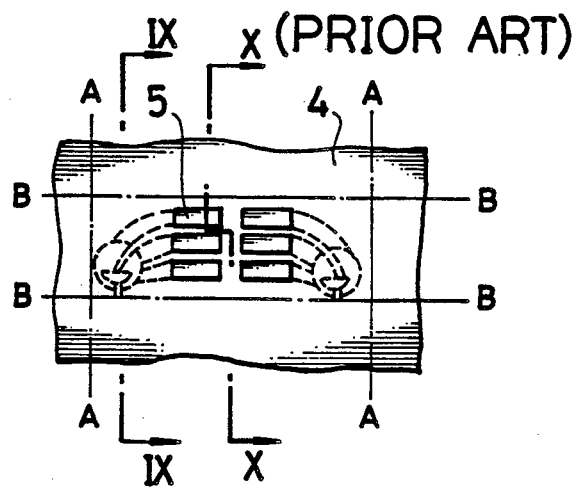
Figure 9:
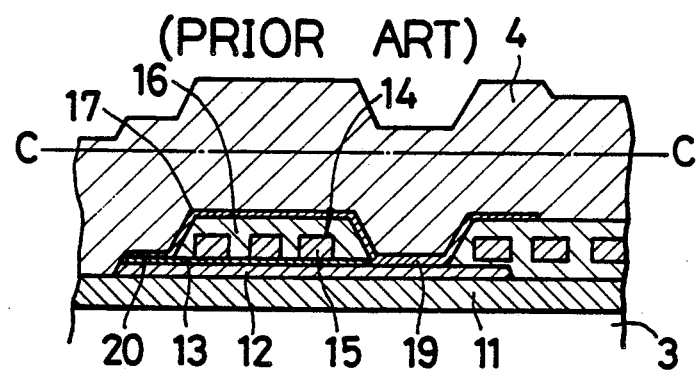
Figure 10:
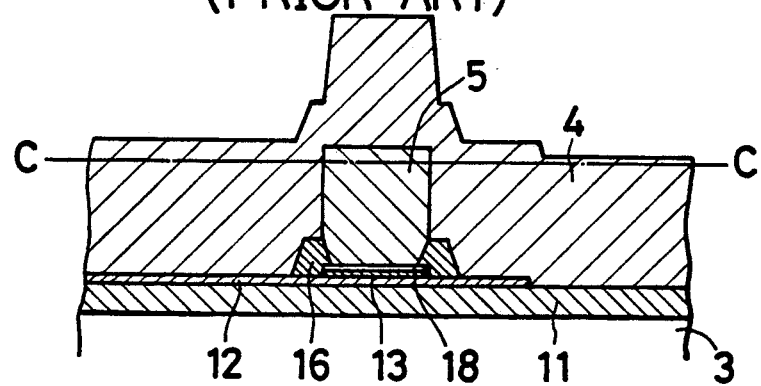

When a laminar magnetic head 1 which is formed in the manner as described above is compared with a conventional head as illustrated in FIGS. 6 through 8, the following differences become apparent.

(1) In a conventional head, since a bonding pad 5 is formed only directly above a set of lead terminals 18, any attempt to enlarge the area of the bonding pad 5 without enlarging the spaces among the lead terminals 18 inevitably reults in formation of an oblong bonding pad having a long diameter along the direction of the lead terminals 18, which does not contribute at all to improvement of the workability and strength of the head for electric connection.

Also in a conventional head, the space between any two adjacent bonding pads 5 is narrow as it is limited by the distance between two sets of lead terminals 18. A narrow space can easily cause a short circuit when a lead wire 6 is connected to an external object by means of soldering. On the other hand, in order to laterally enlarge a bonding pad 5, the non-magnetic substrate 3 should be made considerably thick, making the resultant head large and heavy.

(2) To the contrary in the embodiment described above, the bonding pads 5 and the lead terminals 18 are formed criss-cross as viewed from above so that there is always provided a space for laterally extending the bonding pads 5 or for enlarging the space between any two adjacent bonding pads in the direction parallel to the lead terminals 18 or the lateral direction of the magnetic head. Therefore, the workability and the strength of a magnetic head of this type can be improved without augmenting the size and weight of the non-magnetic substrate 3.

Figure 4:
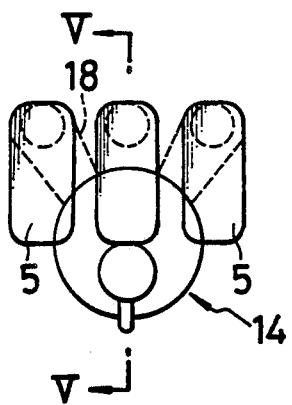
FIGS. 4 and 5 are schematic illustrations of a second embodiment of the invention, in which a bonding pad 5 is formed on a coil 14 or an upper magnetic layer 17.
Figure 5:
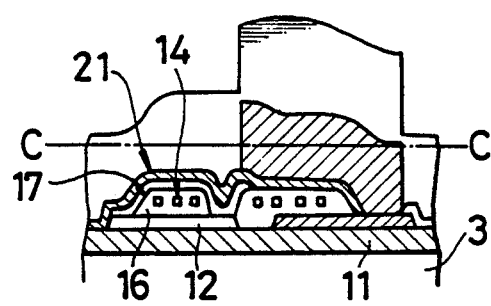

Now referring to FIGS. 4 and 5 which illustrate a second embodiment of the invention, this embodiment differs from the above embodiment only in that it has an additional insulator layer 21 formed between a bonding pad 5 and a coil 14.

In the above embodiments, the devices, circuits and other components are formed in so many layers on a non-magnetic substrate 3 and bonding pads 5 which are also formed in the form of layers of a conductive material and connected with the lead terminals are placed on the devices and circuits with interposition of insulator layers 16. In other words, since the bonding pads 5 are three-dimensionally formed on said devices and circuits, the spaces for the devices and circuits in the lower layers should not necessarily be reduced to achieve compactness for the head and a sufficient room can be secured for the bonding pads 5 to ensure a good workability and an enough strength required in an operation to connect the head with external objects.

As is apparent from the above description, the present invention provides a laminar magnetic head having bonding pads formed in so many layers and laminated with laminar component devices and circuits so that the surface areas of the bonding pads can be significantly enlarged without altering the arrangement of the lower layers of devices and circuits. Such a design ensures miniaturization and realization of a complex structure of a head as well as an enhancement of the workability and strength of the lead wires of the head for connection by simply altering the pattern of arrangement of the bonding pads and without significantly altering the production process that can involve a rise of cost.

What is claimed is:

1. A thin film magnetic head comprising:
   magnetic head circuits including a plurality of devices interconnected by thin film lamination, and having first and second lead terminals;
   first and second bonding pads formed above said first and second lead terminals, wherein at least one of said bonding pads extends over both of said first and second lead terminals; and
   an insulator layer interposed between said lead terminals and said bonding pads, said insulator layer including a first opening to permit interconnection of said first bonding pad to one of said first and second lead terminals, and said insulator layer including a second opening to permit interconnection of said second bonding pad to the other of said first and second lead terminals.

2. A thin film magnetic head as in claim 1, wherein one of said first and second bonding pads includes a portion which extends above said devices, and wherein said thin film magnetic head further includes a second insulator layer interposed between said devices and said portion of said bonding pad which extends above said devices.

* * * * *